United States Patent [19]
Yoshida et al.

[11] Patent Number: 5,913,570
[45] Date of Patent: Jun. 22, 1999

[54] FOLDING SEAT FOR VEHICLE

[75] Inventors: Masami Yoshida, Tochigi-ken; Osamu Shirase, Saitama, both of Japan

[73] Assignees: Tokyo Seat Co., Ltd.; Honda Giken Kogyo Kabushiki Kaish, both of Japan

[21] Appl. No.: 09/040,605

[22] Filed: Mar. 18, 1998

[30] Foreign Application Priority Data

Mar. 27, 1997 [JP] Japan ................................. 9-093233

[51] Int. Cl.$^6$ .................................................. B60N 2/02
[52] U.S. Cl. ........................... 297/378.14; 297/378.1; 297/403; 296/66; 296/65.09
[58] Field of Search ................ 297/378.14, 378.1, 297/403, 408, 397; 296/66, 65.09, 65.16, 64

[56] References Cited

U.S. PATENT DOCUMENTS

| | | | |
|---|---|---|---|
| 3,449,012 | 6/1969 | Caron | 297/403 |
| 4,376,552 | 3/1983 | Pilhall | 297/378.1 X |
| 5,044,683 | 9/1991 | Pärsson | |
| 5,730,496 | 3/1998 | Hashimoto | 297/378.1 X |

FOREIGN PATENT DOCUMENTS 4548  1/1989  Japan ..................................... 297/403

*Primary Examiner*—Laurie K. Cranmer
*Attorney, Agent, or Firm*—Dann, Dorfman, Herrell and Skillman, P.C.

[57] ABSTRACT

A folding seat for a vehicle comprises a strap assembly (5) provided on the bottom of a seat cushion (2) and including a first belt member (50) providing a connection between the bottom of the seat cushion (2) and the back of the seat back (3) when the seat is folded, and a second belt member (51) cooperative with the first belt member (50) to fasten and retain the head rest body (41) when the seat is folded. The strap assembly (5) can be used to retain together all the seat components including the head rest (4) in a single compact folded configuration, thus providing over the rear of the seat back (3) an extra space adding to the existing space for baggage loading or other purposes.

5 Claims, 4 Drawing Sheets

FOLDING SEAT FOR VEHICLE

BACKGROUND OF THE INVENTION

1. Field of the Invention

The present invention relates to a folding seat for use in a car, which can be folded for the space over the rear of the seat back to add to the existing internal space, thereby increasing the capacity of baggage loading, etc.

2. Description of the Prior Art

Generally, a folding seat used in a car like a wagon car, camping car, etc. essentially comprises a base frame to be installed to the floor of a car body, a seat cushion, a seat back, and a head rest, and is designed to be foldable. In the normal use of the folding seat, the base frame supports the seat cushion in a flat position and the seat back in an oblique standing position. For using the seat in a folded configuration, the seat cushion is turned or swung forward about the forward end thereof to upright position from the base frame, the seat back is tilted down forward about the lower end thereof, and then the head rest is removed from the seat back.

However, the folding seat of this type has no special space for receiving the head rest having been removed from the seat back. Normally, the removed head rest is to be placed in a side pocket of the car body or any other vacant space in the car. For reinstallation to the seat back during reassembling of the seat, the head rest should be brought back into place from such a separate place, which will be troublesome. In the case of a car having a plurality of such folding seats provided therein, the head rests once thus removed should be identified from each other so that they will not be returned to wrong seats, which will be a further annoyance.

Accordingly, it has been desired to provide a folding seat of which the whole including a head rest can be folded compactly into a single folded configuration and the head rest can be kept together with other seat components in a same place after folding. In the case of a prior-art folding seat, it is not any rare case that such a head rest removed from the seat back is merely placed flat on the seat back. However, the head rest thus placed will easily fall down from on the seat back due to vibrations while the car is running, and also interfere with effective use of the internal space over the rear of the seat back for baggage loading or other purposes.

Folding a car seat as a whole into a single compact configuration may be attained by turning forward the seat cushion to upright position, tilting down the seat back forward, and inserting the supporting stay of the head rest between the bottom of the seat cushion and the top of the seat back to erect the head rest body. However, if the head rest is retained in this manner, the weight of the head rest in addition to a shock exerted to the seat cushion when the car is stopped will cause the seat cushion to easily be turned further forward, with a result that the compactness of the folded seat configuration will possibly be lost.

SUMMARY OF THE PRESENT INVENTION

Accordingly, the present invention has an object to overcome the drawbacks of the prior art by providing a vehicle-oriented folding seat of which the whole including a head rest can be folded into a single compact configuration and which permits to stably provide over the rear of a seat back a useful space for baggage loading or like purposes.

The present invention has another object to provide a vehicle-oriented folding seat of which the whole including a head rest is easy to fold into a single compact configuration and which can easily be reassembled to its initial configuration.

According to an aspect of the present invention, a folding seat for a vehicle is provided which comprises, as will be set forth in Claim 1, a base frame fixed to a car body floor; a seat cushion adapted to be pivoted about the forward end thereof to upright position from the base frame when folding the seat; a seat back adapted to be tilted down forward about the lower end thereof when folding the seat; and a head rest adapted to be removable and including a body and a stay which is to be inserted between the bottom of the seat cushion and the top of the seat back to erect the head rest body when the seat is folded, the seat as a whole being thus foldable compactly into a single structure; and further a strap assembly provided on the bottom of the seat cushion and including a first belt member which provides a connection between the bottom of the seat cushion and the back of the seat back when the seat is folded, and a second belt member cooperative with the first belt member to fasten and retain the head rest body.

According to another aspect of the present invention, a folding seat for a vehicle is provided which comprises, as will be set forth in Claim 2 later, a strap assembly provided on the bottom of a seat cushion and including a first belt member extending through an opening of a donut-shaped head rest body, and a second belt member cooperative with the first belt member to fasten and retain the head rest body.

According to a still another aspect of the present invention, a folding seat for a vehicle is provided which comprises, as will be set forth in Claim 3 later, a strap assembly including a retainer secured to the bottom of a seat cushion, a first belt member led from the retainer and having provided at the free end thereof a coupler which is removably attachable to the rear of a seat back, and a second belt member led from the retainer and which can be joined to, and disjoined from, the first belt member.

According to a yet another aspect of the present invention, a folding seat for vehicle is provided which comprises, as will be set forth in Claim 4, a headed stepped pin studded in the rear of a seat back, and a strap assembly with a coupler having formed therein a combination of large- and small-diameter holes, the headed stepped pin being engaged in the combination hole in the coupler to fix the strap assembly to the rear of the seat back while the pin is disengaged from the combination hole to release the strap assembly from the seat back.

According to a still yet another aspect of the present invention, a folding seat for a vehicle is provided which comprises, as will be set forth in Claim 5 later, a strap assembly including a first belt member and a second belt member which can easily be connected to, and disconnected from, the first belt member by means of hook-and-loop fasteners.

BRIEF DESCRIPTION OF THE DRAWINGS

These objects and other objects, features, aspects and advantages of the present invention will become more apparent from the following detailed description of the present invention when taken in conjunction with the accompanying drawings, in which.

DETAILED DESCRIPTION OF THE PREFERRED EMBODIMENTS

Figure 1:
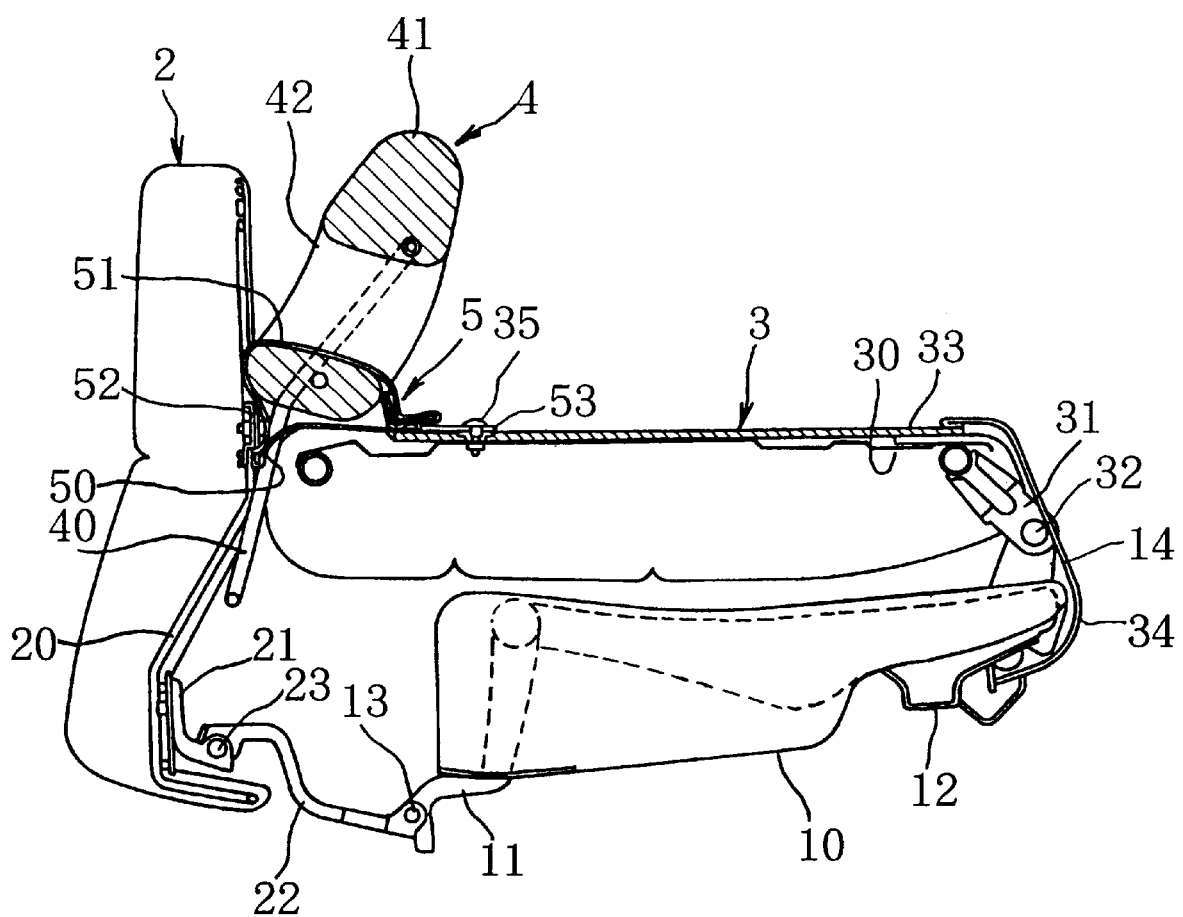
FIG. 1 is a side elevation of a folding seat for a vehicle according to the present invention, the seat being in a folded configuration.

Referring now to FIG. 1, the folding seat according to the present invention is shown in a folded configuration. The folding seat comprises a base frame 1 which is to be installed to the floor of a car body. The base frame 1 is housed in and covered with a base frame cover 10 open at the bottom thereof and formed to have a generally trapezoidal shape. The base frame cover 10 is made of a synthetic resin by molding. The base frame 1 has a forward bracket frame 11 and a rearward bracket frame 12. The base frame 1 is fixed at the bracket frames 11 and 12 thereof directly or by means of sliding rails, respectively, to the car body floor. Further, the folding seat comprises a seat cushion 2 and a seat back 3. In the normal use of the seat, the seat cushion 2 is positioned flat on the base frame 1, and the seat back 3 is retained in an obliquely standing position.

The seat cushion 2 is assembled to the base frame 1 to be pivotable about its forward end thereof upward from the base frame 1 by means of a hinge mechanism. The hinge mechanism includes the forward bracket frame 11 extending under the forward portion of the base frame 1, a bracket 21 attached to the forward bottom portion of a seat cushion frame 20, and a crank arm 22. The forward bracket frame 11 is linked to the bracket 21 by means of the crank arm 22. The crank arm 22 is linked to the forward bracket frame 11 and bracket 21, respectively, by means of fulcrum shafts 13 and 23, respectively. Thus, the crank arm 22 can be pivoted or swung about the shaft 13, and the seat cushion 2 be pivoted about the shaft 23, both forwardly of the base frame 1. In this way, the seat cushion 2 can be turned to upright position as shown.

To fold down the seat back 3 onto the base frame 1 after swinging out the seat cushion 2 forward and erecting to upright position as mentioned above, a reclining mechanism is operated to tilt down the seat back 3 forward about the lower end thereof onto the base frame cover 10. The reclining mechanism is a framework including a bracket plate 14 rising from the base frame cover 10 at the rear end of the base frame 1, and a bracket plate 31 extending from the under side of a seat back frame 30, the bracket plates 14 and 31 being pivotably linked to each other by a pivot 32.

In addition to the aforementioned construction, a backboard (not illustrated) with a carpet 33 thereon may be provided on the rear of the seat back 3. Thus, the surface of the carpet 33 will form a part of the bottom of a space for baggage loading, etc. therein. As mentioned above, the seat cushion 2 can be swung out forward to upright position owing to the crank arm 22. Namely, the seat cushion 2 is thus moved forward over a distance nearly equal to the length of the crank arm 22. Therefore, an extra space thus resulted over the rear of the seat back 3 will added to the existing space. Further, a back cover 34 may be provided for covering the lower end of the seat back 3 thus tilted down over the base frame 1 and the rear end of the base frame 1, thereby providing an esthetically improved appearance of the rear portion of the seat thus folded.

The folding seat also comprises a head rest 4 including a body 41 and a stay 40 by which the head rest 4 is removably installed to the top of the seat back 3. Before folding the seat, the head rest 4 is removed from the seat back 3. The stay 40 of the removed head rest 4 is inserted between the bottom of the seat cushion 2 having been swung out from on the base from 10 and the top of the seat back 3 tilted down forward, thus erecting the head rest body 41. The head rest 4 can thus be kept in place along with the other disassembled seat components. The head rest 4 shown in Figures is of a so-called see-through type comprising a donut-shaped head rest body 41 having a central opening 42 therein.

The folding seat according to the present invention further comprises a strap assembly 5 provided on the bottom of the seat cushion 2 to tie the head rest 4 to the other disassembled seat components. The strap 5 comprises a first belt member 50 which provides a connection between the bottom of the seat cushion 2 swung out forward from on the base bracket and the rear of the seat back tilted down forward, and a second belt member 51 cooperative with the first belt member 50 to fasten and retain the head rest body 41 as inserted between the bottom of the seat cushion 2 and the rear of the seat back 3.

Figure 2:
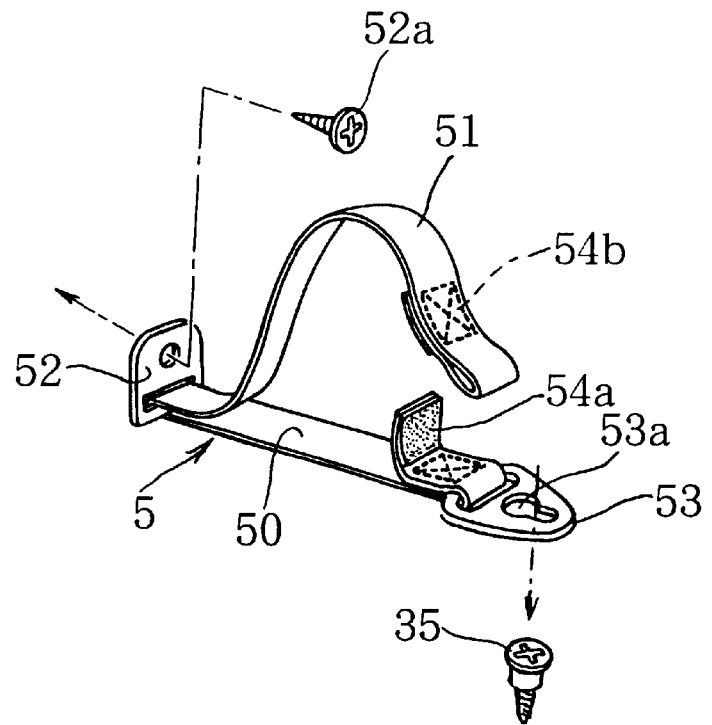
FIG. 2 is a perspective view of a strap assembly provided on the folding seat of the present invention.

More specifically, the strap assembly 5 comprises a retainer 52 adapted to be secured to the bottom of the seat cushion 2 and from which the first and second belt members 50 and 51 are led out, and a coupler 53 provided at the free end of the first belt member 50 and which can be removably fixed to the rear of the seat back 3, as shown in FIG. 2. The coupler 53 thus allows the first belt member 50 to be fixed to, and released from, the rear of the seat back 3.

The strap assembly 5 can easily be secured to the bottom of the seat cushion 2 by fixing the retainer 52 with a screw 52a. The first and second belt members 50 and 51 are provided at their respective free ends with hook-and-loop fasteners 54a and 54b, respectively, which can be joined to each other, thereby providing an easy and quick connection and disconnection between the first and second belt members 50 and 51. Owing to this strap assembly 5, the disassembled seat components can be tied together easily and quickly.

Figure 3:
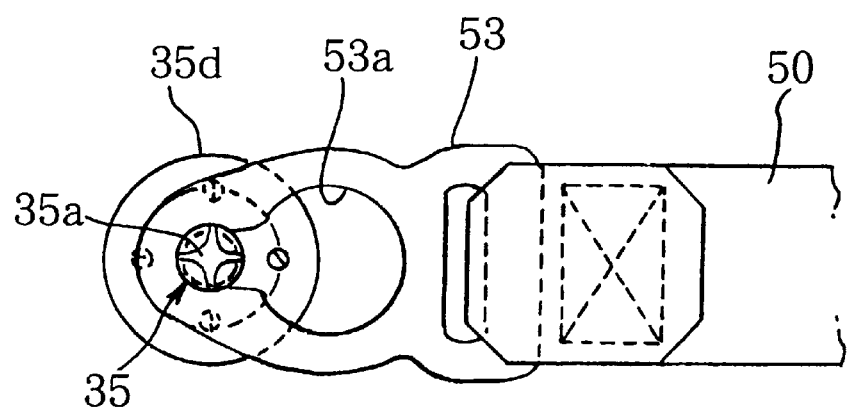
FIG. 3 is a plan view of a coupler of the strap assembly.
Figure 4:
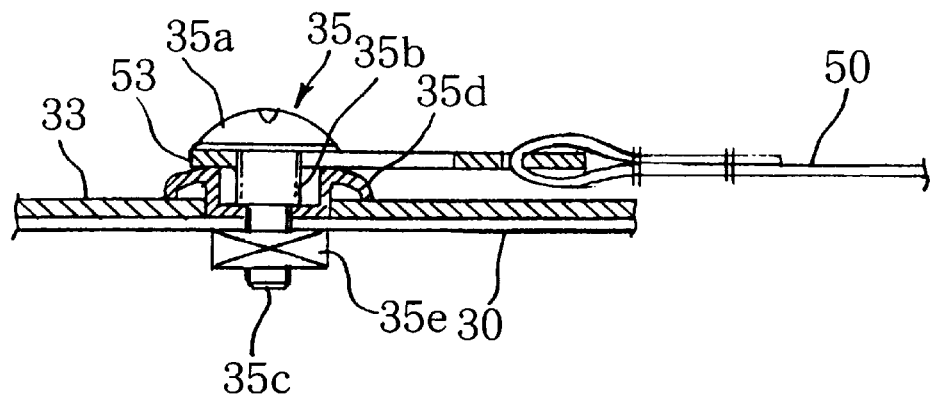
FIG. 4 is a partially sectional view of the strap assembly in FIG. 3, showing how the coupler is fixed to the seat back.

As seen from FIG. 3, the coupler 53 of the strap 5 is a plate having formed therein a combination 53a of a circular or large-diameter hole and an elongated or small-diameter hole in which a headed stepped pin 35 driven or studded in the rear of the seat back 3 is removably engaged. As shown in FIG. 4, the headed stepped pin 35 is a bolt consisting of a head portion 35a, a shaft portion 35b smaller in diameter than the head 35a, and an externally threaded shaft portion 35c having a further reduced diameter and long enough to project down out of the seat back 3. Therefore, the coupler 53 can easily be engaged on the pin 35 just by applying it for the head 35a of the pin 35 to first come into the large-diameter one, or the circular one shown by way of example in Figures, of the combination hole 53a, and then moving or pulling the coupler 53 for the shaft portion 35b to engage into the small-diameter hole, or the elongated one shown by way of example in Figures. Also, the coupler 53 can easily be disengaged from the pin 35 by reversely following the above-mentioned engaging procedure. The headed stepped pin 35 provided on the rear of the seat back 3 will not interfere with baggage loading or like working in the space over the rear of the seat back 3.

Furthermore, the headed stepped pin 35 can be fixed more securely by applying and fixing to the outer surface of the carpet 33 a garnish 35d having a central hole formed therein, penetrating the threaded shaft portion 35c through the seat back frame 30 from the central hole of the garnish 35d, and then tightening a nut 35e fitted on the threaded shaft portion 35c As shown in FIG. 1, the strap assembly 5 should preferably be located in such a manner that the first belt member 50 can be led out generally horizontally from the bottom of the seat cushion 2 toward the rear of the seat back 3. For a head rest such as the head rest 4 having the donut-shaped body 41, the second belt member 51 may be a belt member having a sufficient length to be routed through the opening 42 of the head rest body 41 separately from the first belt member 50 and then joined to the first belt member 50.

According to the present invention, the seat cushion 2 is swung out forward to upright position from on the base frame 1 by means of the hinge mechanism, and the head rest 4 is removed from the seat back 3, and seat back 3 is tilted down forward onto the base frame cover 10 by operating the reclining mechanism. In this folded configuration, the strap assembly 5 will appear on the bottom surface of the seat cushion 2. Therefore, the strap assembly 5 can be readily used because it is not hidden anywhere in this folded seat.

The seat cushion 2 and seat back 3 can fixedly be connected to each other by extending the first belt member 50 of the strap assembly 5 from the retainer 52 toward the headed stepped pin 35 studded in the seat back 3, and engaging the coupler 53 at the free end of the belt member 50 at the combination hole 53a thereof onto the pin 35. Thus, the first belt member 50 permits to stably retain the seat cushion 2 in the standing posture and the seat back 3 in the forward down-tilted position.

Next, the stay 40 of the head rest 4 is inserted between the bottom of the seat cushion 2 retained in the upright position and the rear of the forward down-tilted seat back 3, thereby keeping erected the head rest body 41 between the seat cushion 2 and seat back 3. At this time, the head rest 4 should be handled in such a manner that the first belt member 50 is positioned under the head rest body 41.

Figure 5:
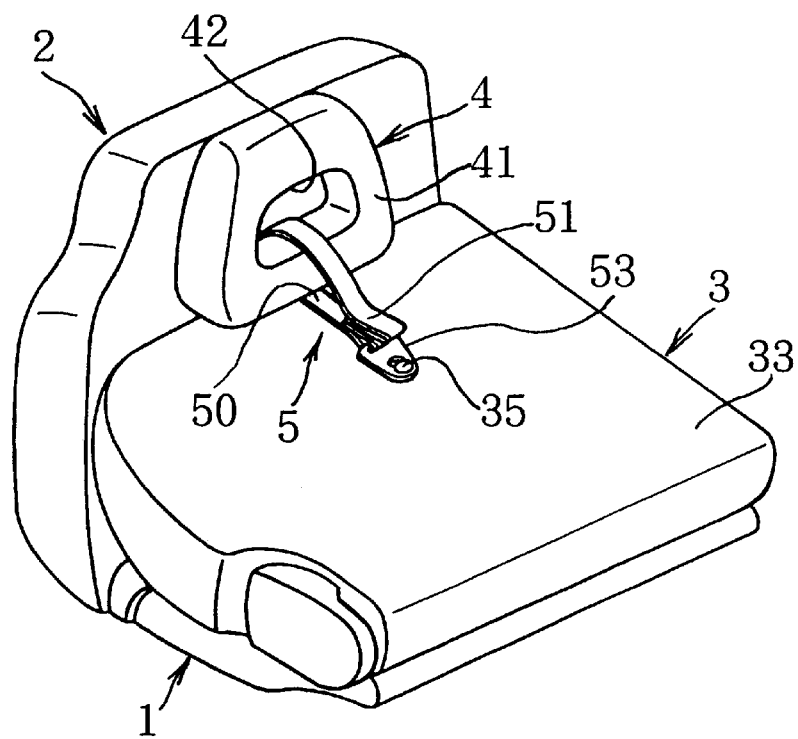
FIG. 5 is an explanatory drawing showing how the head rest is secured between the bottom of the seat cushion and the rear of the seat back of the folding seat according to the present invention.

Thereafter, the second belt member 51 is led out from the retainer 52 of the strap 5 independently of the first belt member 50, and passed through the opening 42 of the head rest body 41 toward the rear of the seat back 3 as shown in FIG. 5. The second belt member 51 is joined again to the first belt member 50 by attaching the hook-and-loop fastener 54b on the second belt member 51 to the one 54b of the second belt members 50. Thus the head rest body 41 can stably be retained in a limited space between the bottom of the seat cushion 2 and the rear of the seat back 3.

As having been described above, the strap assembly 5 can be used to securely retain the seat components including the head rest 4 in a single compact folded configuration. An extra space resulted from this seat folding will add to the existing space for baggage loading or other purposes.

According to the present invention, what is necessary for reassembling the disassembled seat components is to remove the strap assembly 5 from the seat back 3. The seat components thus untied can easily be rendered to their respective initial positions for the normal use of the folding seat. In the reassembled configuration of the folding seat for the normal use, the strap assembly 5 will take a place between the base frame 1 and seat back 3, and only the headed stepped pin 35 is exposed as shown in FIG. 6, which however will not esthetically spoil the appearance of the folding seat.

Figure 6:
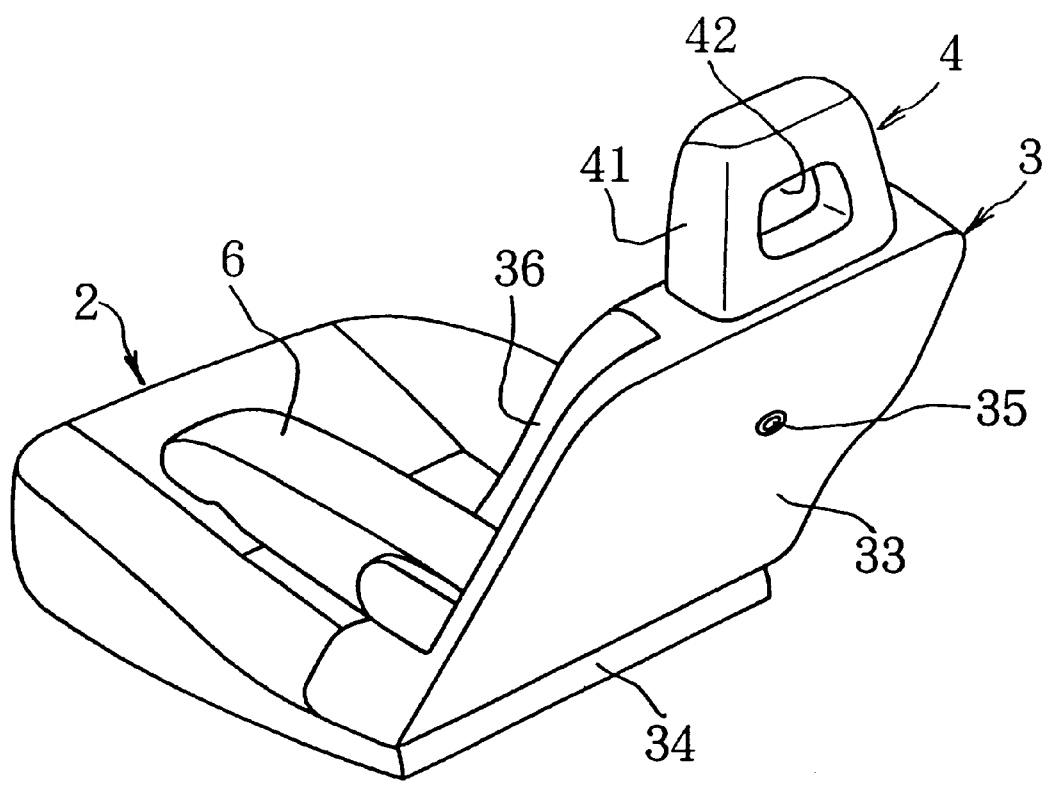
FIG. 6 is a view, from the rear, of the folding seat of the present invention used in the normal configuration.

The folding seat according to the present invention may comprise an arm rest 6 provided at the lateral side of the seat back 3 as shown in FIG. 6. In this case, the arm rest 6 is installed to the seat back 3 pivotably about the base thereof and the seat back 3 is stepped, for example, as generally indicated at a reference numeral 36, along that lateral side thereof to receive therein the arm rest 6 erected when unnecessary.

Also, the folding seat according to the present invention may include an ordinary head rest different from the donut-shaped one 4 having been referred to above herein for the purposes of illustrating and describing the present invention. In this case, the folding seat according to the present invention may be modified so that the second belt member of the strap assembly has a sufficient length to extend from the retainer along the top and front face of the head rest body down to near below the head rest body and it is joined to the first belt member by means of hook-and-loop fasteners.

As having been described in the foregoing, the present invention comprises the strap assembly provided on the bottom of the seat cushion and including the first belt member which connects the bottom of the seat cushion and the back of the seat back to each other when the seat is folded, and the second belt member cooperative with the first belt member to fasten and retain the head rest body. In the folded configuration, the first belt member can be used to retain the seat cushion in the erected posture and the seat back in the forward down-tiled position, which will assure, over the rear of the seat back, an extra space adding to the existing space for baggage loading or for other purposes. By joining the first and second belt members to each other, all the seat components including the head rest can be securely retained in the compact folded configuration. The seat components can easily be rendered back to their respective initial positions.

As also having been described in the foregoing, the present invention comprises the strap assembly including the first belt member extending through the opening of the donut-shaped head rest body, and the second belt member cooperative with the first belt member to fasten and retain the head rest body. Thus, the strap assembly can be used to stably retain the head rest as secured to the other seat components in the compact folded configuration.

Further, as having been described in the foregoing, the present invention comprises the strap assembly including the retainer secured to the bottom of the seat cushion. This feature allows all the disassembled seat components to be retained in the compact folded configuration. The strap assembly can easily be removed for the rear of the seat back for reassembling the seat components back to their initial postures.

As having previously been described, the present invention comprises the headed stepped pin studded in the rear of the seat back, and the strap assembly having provided at the free end of the first belt member the coupler in which the combination of large- and small-diameter holes is formed. The headed stepped pin can easily be engaged in, and disengaged from, the combination hole in the fastener, whereby the strap can easily be fixed to and released from the rear of the seat back. The existence of the headed stepped pin on the rear of the seat back will not interfere with baggage loading or other use of the car internal space and also will not esthetically spoil the appearance of the folding seat in the normal use.

Furthermore, as having been described in the foregoing, the present invention comprises the strap assembly including the second belt member which can be joined to, and disjoined from, the first belt member by means of the hookand-loop fasteners. The joining and disjoining of the second belt member to and from the first belt member can be attained very easily.

What is claimed is:

1. A folding seat for a vehicle, comprising:

a base frame fixed to a car body floor;

a seat cushion pivotable about the forward end thereof to upright position from the base frame when folding the seat;

a seat back tiltable down forward about the lower end thereof when folding the seat;

a removable head rest having a body and a stay which is to be placed between the seat cushion and the top of the seat back when the seat is folded;

the seat as a whole being thus foldable compactly into a single folded configuration; and a strap assembly provided on the bottom of the seat cushion and including a first belt member which provides a connection between the seat cushion and seat back between the bottom of the seat cushion and the back of the seat back when the seat is folded, and a second belt member cooperative with the first belt member to fasten and retain the head rest body when the seat is folded.

2. The folding seat according to claim 1, wherein the head rest body has a donut-shape in outline, and the second belt member extends through an opening of the donut-shaped head rest body and is cooperative with the first belt member to fasten and retain the head rest body.

3. The folding seat according to claim 1 or claim 2, wherein the seat further includes a retainer secured to the bottom of the seat cushion, the first belt member is led from the retainer and has a coupler provided at the free end thereof, the coupler being removably attachable to the rear of the seat back, and the second belt member is led from the retainer and can be joined, and disjoined from, the first belt member.

4. The folding seat according to claim 3, wherein the seat further includes a headed stepped pin studded in the rear of the seat back, the coupler has a combination of large- and small-diameter holes formed therein, and the headed stepped pin is engaged in the combination hole in the coupler to fix the strap assembly to the rear of the seat back while the pin is disengaged from the combination hole to release the strap assembly from the seat back.

5. The folding seat according to claim 3, wherein the first belt member and the second belt member can be joined to, and disjoined from each other by means of hook-and-loop fasteners.

* * * * *